US012097844B2

United States Patent
Rezvan Behbahani et al.

(10) Patent No.: US 12,097,844 B2
(45) Date of Patent: Sep. 24, 2024

(54) CONSTRAINING VEHICLE OPERATION BASED ON UNCERTAINTY IN PERCEPTION AND/OR PREDICTION

(71) Applicant: Zoox, Inc., Foster City, CA (US)

(72) Inventors: Siavosh Rezvan Behbahani, Redwood City, CA (US); Ali Ghasemzadehkhoshgroudi, Foster City, CA (US); Sai Anurag Modalavalasa, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 131 days.

(21) Appl. No.: 16/862,693

(22) Filed: Apr. 30, 2020

(65) Prior Publication Data
US 2021/0339741 A1 Nov. 4, 2021

(51) Int. Cl.
*B60W 30/09* (2012.01)
*B60W 30/095* (2012.01)
*B60W 40/04* (2006.01)
*B60W 60/00* (2020.01)

(52) U.S. Cl.
CPC ........ *B60W 30/09* (2013.01); *B60W 30/0956* (2013.01); *B60W 40/04* (2013.01); *B60W 60/0011* (2020.02)

(58) Field of Classification Search
CPC .. B60W 30/09; B60W 30/0956; B60W 40/04; B60W 60/0011; G08G 1/164; G08G 1/165; G08G 1/166; G05D 1/0223
See application file for complete search history.

(56) References Cited

U.S. PATENT DOCUMENTS

| 10,011,276 | B2 | 7/2018 | Obata et al. |
| 10,353,390 | B2 | 7/2019 | Linscott et al. |
| 2011/0208496 | A1* | 8/2011 | Bando ..................... G01S 19/49 703/2 |
| 2013/0197736 | A1* | 8/2013 | Zhu ....................... G05D 1/0088 701/26 |
| 2014/0303883 | A1* | 10/2014 | Aso ........................ G08G 1/165 701/300 |

(Continued)

FOREIGN PATENT DOCUMENTS

JP 2008158969 A * 7/2008

OTHER PUBLICATIONS

The PCT Search Report and Written Opinion mailed Jul. 22, 2021 for PCT application No. PCT/US21/29589, 9 pages.

*Primary Examiner* — Abby Y Lin
*Assistant Examiner* — Danielle M Jackson
(74) *Attorney, Agent, or Firm* — Lee & Hayes, P.C.

(57) ABSTRACT

Techniques and methods associated with performing monitoring associated with operations of autonomous vehicles. For instance, the vehicle may capture sensor data using one or more sensors. The vehicle may then analyze the sensor data using systems in order to determine estimated locations associated with the vehicle and estimated locations associated with situations that may result in a potential unsafe scenario represented by the sensor data. Additionally, the vehicle may determine a distribution of estimated locations associated with the vehicle and using the distributions of estimated locations, the vehicle may determine risk probabilities associated with operations of the vehicle. The vehicle may then redefine or update a route or maneuver to perform when the risk probability exceeds a threshold.

20 Claims, 8 Drawing Sheets

(56) References Cited

U.S. PATENT DOCUMENTS

| | | | |
|---|---|---|---|
| 2017/0039865 A1* | 2/2017 | Takabayashi | G08G 9/02 |
| 2017/0199274 A1* | 7/2017 | Sasabuchi | G06K 9/00805 |
| 2017/0210379 A1* | 7/2017 | Obata | B60W 30/0956 |
| 2018/0089563 A1* | 3/2018 | Redding | G05D 1/0088 |
| 2018/0141544 A1* | 5/2018 | Xiao | G05D 1/0212 |
| 2018/0336297 A1* | 11/2018 | Sun | G01M 17/00 |
| 2019/0213443 A1* | 7/2019 | Cunningham | G06K 9/6256 |
| 2020/0004259 A1* | 1/2020 | Gulino | G05D 1/0251 |
| 2020/0094849 A1* | 3/2020 | Weber | B60W 50/0225 |
| 2020/0148200 A1* | 5/2020 | Lerner | G08G 1/162 |
| 2021/0046954 A1* | 2/2021 | Haynes | B60W 60/00272 |
| 2021/0276572 A1* | 9/2021 | Du | B60W 40/105 |
| 2021/0278228 A1* | 9/2021 | Takhirov | G01C 21/3461 |
| 2022/0024475 A1* | 1/2022 | Tzempetzis | B60W 30/08 |

\* cited by examiner

CONSTRAINING VEHICLE OPERATION BASED ON UNCERTAINTY IN PERCEPTION AND/OR PREDICTION

BACKGROUND

Autonomous vehicles may navigate along routes. For example, when the autonomous vehicles receive requests to travel to destination locations, the autonomous vehicles may navigate along routes from the current locations of the autonomous vehicles to a pickup location to pick up a passenger and/or from the pickup location to the destination locations. While navigating, the autonomous vehicles may detect other objects in the environment and predict their behavior. Uncertainty in the detected location and/or the predicted behavior of the other objects may create challenges for the vehicle to safely navigate through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
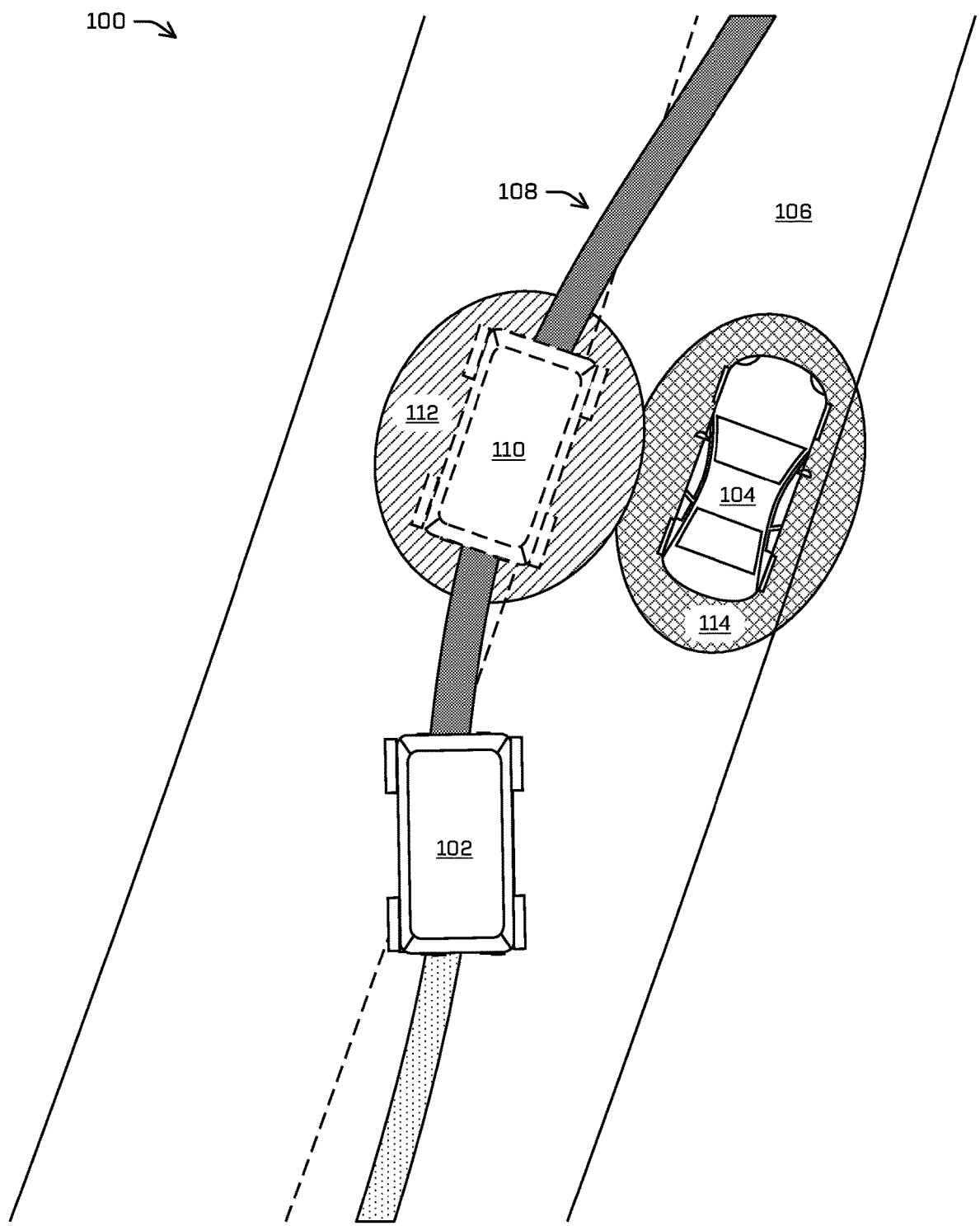
FIG. 1 is a pictorial view of an example environment that includes a vehicle operating in an environment and taking into account uncertainty in a system of the vehicle, in accordance with embodiments of the disclosure.

As discussed herein, autonomous vehicles may navigate through physical environments. For example, when an autonomous vehicle receives a request to travel to a destination location, the autonomous vehicle may navigate along a planned path from the current location of the autonomous vehicle to a pickup location to pick up a passenger and then from the pickup location to the destination location. While navigating, the autonomous vehicle may encounter dynamic objects (e.g., vehicles, pedestrians, animals, and the like), static objects (e.g., buildings, signage, parked vehicles, and the like) in the environment, and situations which may conflict with a safety requirement or other operational policy. In order to ensure the safety of the occupants and objects, the system and vehicle, discussed herein, may employ safety or risk thresholds when operating in the environment, such that if a vehicle encounters a potentially unsafe or policy violating scenario that has a potential risk above the risk threshold, the vehicle may, at least temporarily, halt operations or contact a remote operator.

In some cases, the autonomous vehicles may operate based on sensor data collected by one or more sensors. The autonomous vehicles may utilize the sensor data to detect, classify, and track objects in the environment. The detected objects and characteristics of those objects (e.g., distance from autonomous vehicle, type or class of object, velocity, heading or direction of travel, etc.) as well as the location or position of the objects within the environment may be generally referred to herein as perception data. In general, the autonomous vehicle may utilize the perception data to predict future behaviors of the objects in the environment. The perception data and the predictions may, in some instances, have uncertainty associated with them (e.g., the object may have a range of predicted movements or trajectories). In some cases, the uncertainty poses challenges related to the navigational safety of the autonomous vehicle. This application describes techniques for constraining operations of a planner and/or drive system of the autonomous vehicles so that the vehicle operates safely (e.g., maintains adequate safety margins) to avoid potential collisions with objects in the environment based on calculated or determine approximations to one or more uncertainties inherent in the sensors, perception system, prediction system, and/or planning system given a set of parameters encountered in the surrounding physical environment.

When the vehicle does encounter potentially unsafe or policy violating scenarios, the systems and vehicles may be configured to perform collision monitoring using error models and/or distributions to evaluate risk or probability of collisions. For example, an autonomous vehicle may use error models and/or distributions uncertainties to determine estimated locations of both the vehicle and one or more objects in the physical environment. In some instances, the estimated locations may include distributions of probability locations associated with the autonomous vehicle and the one or more objects. The autonomous vehicle may then determine a probability of collision between the autonomous vehicle and the one or more objects based on an overlap in the estimated locations.

Sensor data generated by the sensors of the autonomous vehicles may represent these objects and/or scenarios in the physical environment. In some instances, the sensor data may include data captured by sensors such as time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc.

In some case, the system and/or vehicle may be configured to identify and evaluate risks associated with objects and scenarios during operation of the vehicle. Thus, the system discussed herein, may determine a risk or probability of collision based on the sensor data representative of the scenario by first determining an area of geometric overlap at a point in time along the planned path or route in which the autonomous vehicle is nearest in physical proximity to the object obstructing the vehicle.

For example, the system may use error models and/or system uncertainties to determine a probability that an object or the vehicle occupies a portion of an area or distribution about an estimated location or locations of both the autonomous vehicle and the object obstructing the vehicle's planned path as output by the prediction system. In some instances, the estimated locations may include distributions of probability locations associated with the autonomous vehicle and the object. In some cases, the probability distributions may include statistical distributions associated with the estimated locations (such as Gaussian distributions associated with the estimated locations). For example, the system may aggregate or combine the probability distributions for all of then components (e.g., sensors) and/or parameters (or predictions, such as trajectory of the object) to determine the estimated locations. Aggregating and/or combining the probability distributions may include multiplying the probability distributions, summing up the probability distributions, and/or applying one or more other formulas to the probability distributions. In some specific examples, the system may aggregate or fuse sensor data from multiple sensors having multiple sensors types to generate the perception data. For instance, the system may fuse image data, lidar data, and radar data and utilize the fused data to detect the objects, classify the objects, and predict outcomes related to the objects. As a result, the predictions may have some degree to uncertainty (e.g., either from the sensor data or in the predicted outcomes themselves). The system may aggregate the uncertainties from the sensor systems with the uncertainties of the predictive system when generating the probability distributions.

In some cases, the system may determine a first risk or probability of collision between the autonomous vehicle and the object using the estimated locations. For instance, the system may determine the first probability of collision based at least in part on the overlap between the distributions of probability locations of the vehicle and the distributions of probability locations of the object. In some cases, the first probability of collision may be determined via a look-up table representing risk based on overlap of the distributions of probability locations, statistical aggregation associated with overlap of the distributions of probability locations or models, outputs of a machine learned model trained using overlap of distributions of probability locations as an input, etc. For example, details of generating probabilities of collision using distributions of probability locations are discussed in U.S. application Ser. Nos. 16/682,971 and 16/703,625, which are herein incorporated by reference, in their entirety.

The system may then determine whether the first probability of collision meets or exceeds a threshold. In some instances, if the first probability of collision is less than the threshold, then the autonomous vehicle may continue to navigate along the route selected to avoid the object. However, in some instances, if the system determines that the first probability of collision is equal to or greater than the threshold, then the system may simulate or analytically determine additional probabilities of collisions by varying parameters associated with the scenario represented by the sensor data. For instance, the system may vary parameters such as safe distance between the object and the vehicle, velocity of the vehicle, acceleration of the vehicle, changes to the route selected to avoid the object, etc. In various examples, the number and type of parameters varied may be limited to reduce complexity and compute time associated with determining the additional probabilities of collision. In one example, the system may tune the parameters by applying a Monte Carlo technique and comparing results to the first probability of collision.

In this example, once the system has identified a set of parameters that results in a probability of collision less than the threshold, the system may cause the planning system of the autonomous vehicle to reroute or redefine the path avoiding the object based on the identified set of parameters. The vehicle may then proceed to perform the operations associated with the rerouted path, thereby operating the vehicle safely taking into account uncertainty associated with perception data (e.g., detected locations, trajectories, classifications, and/or other characteristics of objects in the environment) and/or prediction data (e.g., predicted future locations, trajectories, classifications, and/or other characteristics of objects in the environment).

Thus, the system discussed herein, may reduce the overall compute time associated with simulating all of the parameters of the potentially unsafe or policy violating scenario by reducing complexity of the probability of collision determination based on the overlap in distributions of probability locations and only varying and testing parameters when the probability of collision exceeds the safety threshold. Additionally, the system may reduce the complexity and compute time of the simulation by utilizing a Monte Carlo approach and varying only limited parameters (such as minimum safe distance between the object and the vehicle). However, it should be understood, that in some cases, the system may be unable to determine a set of safety requirements that maintains a safety rating above a desired safety threshold within a threshold period of time. In these cases, the system may contact or otherwise alert a remote operator to manually operate or drive the vehicle around the object or situation that is causing the policy violation or potentially unsafe or policy violating scenario. In this manner, operations of the vehicle may not be suspended for greater than the threshold period of time.

Additionally, the systems, discussed herein, may be used to develop or generate safety or operational requirements for the autonomous vehicle via one or more machine learned systems, models, or simulations in an offline mode. The sensor data captured by vehicles encountering potentially unsafe or policy violating scenarios may be valuable for generating simulations, testing simulations, and developing requirements (e.g., safe distances in various scenarios) without requiring the autonomous vehicles to first encounter the unsafe or policy violating scenarios during operations on the roads as discussed above. In this manner, the autonomous vehicles may be configured with a set of requirements associated with maintaining risk or probability of collision below the desired threshold when a vehicle later encountering similar scenarios.

In this example, the system may again receive data representing uncertainties and error related to a position of an object and/or the vehicle. The system may again determine a probability of collision with one or more objects by varying parameters and utilizing the area of geometric overlap between the distributions of probability locations of the vehicle and distributions of probability locations of the one or more objects. The system may then apply a Monte Carlo simulation technique to identify a set of requirements or parameters that meet or exceed a desired safety threshold. In some cases, the set of requirements or parameters selected may be based on a combination of parameters that results in the lowest risk of collision by the vehicle for the given scenario. In some implementations, the autonomous vehicles may be equipped with a plurality of sets of requirements or parameters, each set associated with a different potentially unsafe or policy violating scenario that may be quickly and easily (e.g., in less than a threshold period of time while consuming less than a threshold amount of processing resources) accessed and provide to a planning or drive system of the vehicle during operations.

FIG. 1 is a pictorial view of an example environment 100 that includes a vehicle 102 operating in an environment and taking into account uncertainty in a system of the vehicle 102, in accordance with embodiments of the disclosure. For example, while navigating along a planned path, the vehicle 102 may be generating sensor data using one or more sensors of the vehicle 102 and analyzing the sensor data using one or more components, such as localization components, perception components, prediction components, planning components, and/or the like. Based at least in part on the analysis, the vehicle 102 may determine that the vehicle has encountered an object 104 (e.g., a parked or stalled vehicle) obstructing a planned path of the vehicle 102 (e.g., the object 104 is within the lane 106). In this example, the vehicle 102 may attempt to circumvent the obstruction by planning a route 108 around the obstruction as shown. As discussed above, the vehicle 102 or a collision engine operating on the vehicle 102 may determine a point in time 110 (or position along the route 108) at which the vehicle 102 may have a close physical proximity to the object 104.

In the current example, the object 104 is static or stationary (e.g., the vehicle 104 is parked or stalled) but in other examples, the object 104 may be dynamic (e.g., has potential for motion, is moving, or may otherwise change position prior to the point in time 110). In the instance in which the object 104 is dynamic, the vehicle 102 may also determine an estimated location associated with the object 104 at the point in time 110 using the outputs from various sensors. In some cases, to determine the estimated location of either or both of the vehicle 102 or the object 104, the vehicle 102 may analyze, segment, and/or classify captured or collected sensor data in order to identify characteristics and/or parameters associated with an object 104. For instance, the parameters may include, but are not limited to, a type of object, a current location of the object, motion predictions (e.g., speed, velocity, acceleration, potential acceleration, etc.) of the object 104, a direction (or potential direction) of travel of the object 104, and/or the like.

Once, the point in time 110 is determined based on the estimated location of the vehicle 102 and the object 104, the vehicle 102 may determine a probability distribution representing a likelihood the object or the vehicle is occupying a particular portion of environment based at least in part on the estimated locations 112 and 114. The vehicle 102 may then determine a probability of collision between the vehicle 102 and the object 104 based on an overlap in the probability distribution of the estimated locations 112 and 114. In some examples, the vehicle 102 may use one or more error models associated with the determined parameters of the object 104, characteristics associated with the vehicle 102, and/or features associated with the route 108 to assist in determining the probability of collision associated with the probability distributions of the estimated locations 112 and 114.

The vehicle 102 may then compare the probability of collision with a threshold to determine if it is safe for the vehicle 102 to proceed along the new route 108. If the vehicle 102 determines that the probability of collision is less than the threshold, the vehicle 102 may navigate along the route 108 to avoid the object 104 and then continue along the planned path. However, based at least in part on determining that the probability of collision is equal to or greater than the threshold, the vehicle 102 may attempt to determine one or more parameters or requirements associated with the determining the route 108 that may be updated or changed to reduce the probability of collision. For example, the vehicle 102 may begin to perturb selected parameters associated with determining the route 108 and simulating new routes and/or analytically determining additional probabilities of collisions when the new route is restricted based on the varied or perturbed parameters. In one instance, the vehicle 102 may apply a Monte Carlo type simulation based on the sensor data collected by the vehicle 102, the probability distribution of estimated locations 112 and 114 at the point in time 110, and/or perturb selected parameters to generate additional probabilities of collisions. In various examples, the number and type of parameters perturbed may be limited to reduce complexity and compute time associated with determining the additional probabilities of collision.

In this example, once the vehicle 102 has identified a set of parameters that results in a probability of collision less than the threshold, the vehicle 102 may cause the planning component or system to redefine the route 108 to avoid the object 104 while maintaining desired safety thresholds.

Figure 2:
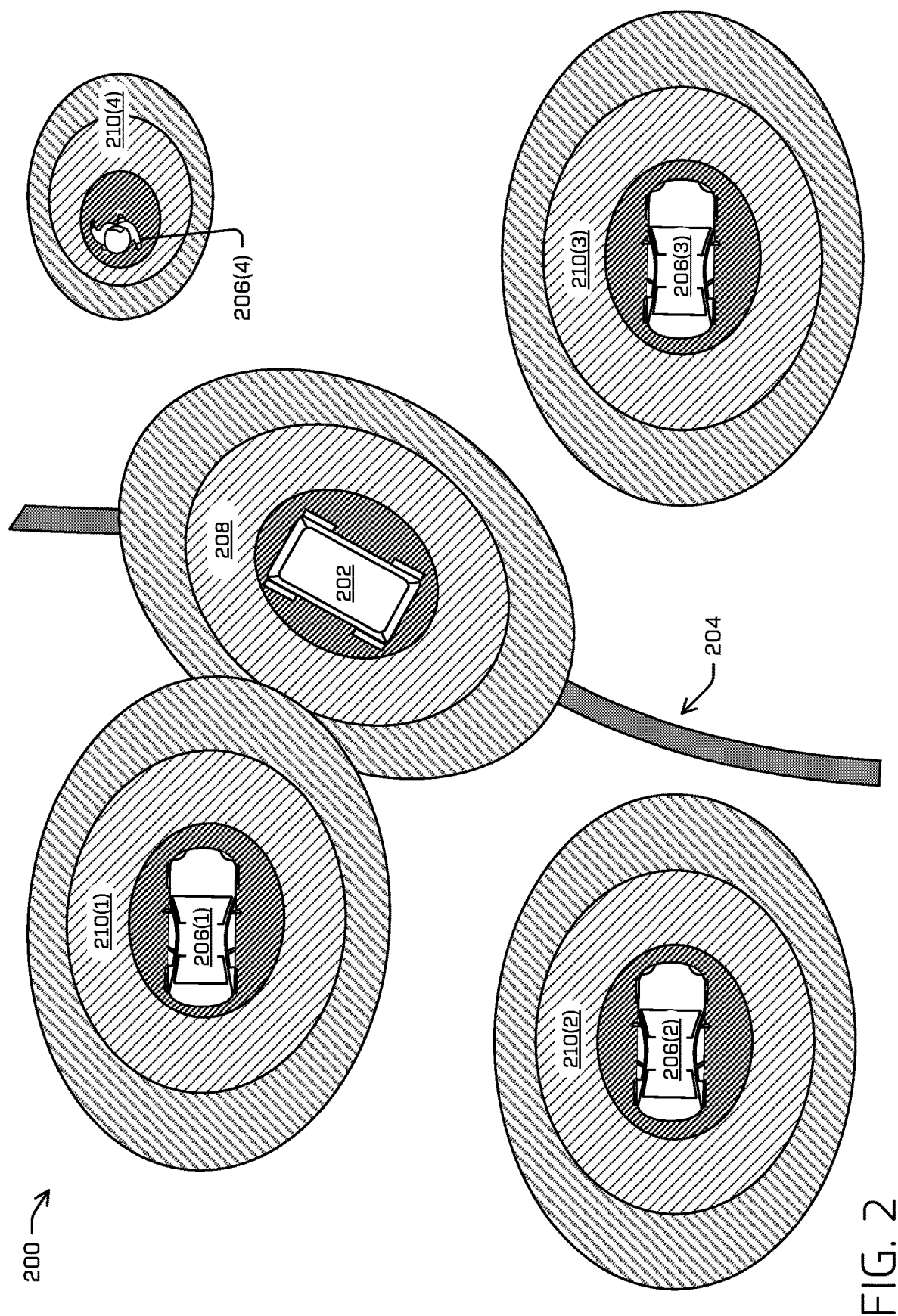
FIG. 2 is another pictorial view of an example environment that includes a vehicle operating in an environment and taking into account uncertainty in a system of the vehicle, in accordance with embodiments of the disclosure.

FIG. 2 is another pictorial view of an example environment 00 that includes a vehicle 202 operating in an environment and taking into account uncertainty in a system of the vehicle 202, in accordance with embodiments of the disclosure. In the illustrated example, the vehicle 202 is planning a route 204 between multiple dynamic objects 206(1)-(4). This example is shown at a point in time along the route 204 that the vehicle 202 is in closest physical proximity to object 206(1). Thus, as discussed above, the vehicle 202 may determine distributions of probability locations 208 associated with the vehicle 202 and distributions of probability locations 210(1) associated with the object 206(1). As discussed above, the vehicle 202 may determine a probability of collision between the vehicle 202 and the object 206(1) based on an overlap in the distributions of probability locations 208 and 210(1) using one or more error models associated with determined parameters of the object 206(1), characteristics associated with the vehicle 202, and/or features associated with the route 204.

However, unlike the example of FIG. 1, in the current illustration, the vehicle 202 may also encounter the additional objects 206(2)-(4) when navigating along the route 206. In this instance, the vehicle 202 may estimate locations for each object 206(1)-(4) and probability distributions 210(1)-(4) for each of the estimated locations. In some cases, the vehicle 202 may use multiple or differing error models to determine the probability distributions 210(1)-(4) based on a type, classification, or parameters known about the various objects 206(1)-(4). For example, the objects 206(2) and 206(3) may be a second and a third vehicle operating on an intersecting lane of the lane of the vehicle 202, while the object 206(4) may be a pedestrian. Thus, the object 206(1) and 206(4) may have different classifications, types, and parameters which may result in different probability distribution 210(1) and 210(4) as shown. For instance, the probability distributions 210(4) associated with the pedestrian 206(4) is smaller than the probability distribution 210(1) as the vehicle 202 is able to determine the probability distribution 210(4) with more accuracy than the probability distribution 210(1) associated with the vehicle 206(1). In other words, the vehicle 202 is able to determine a smaller probability distribution 210(4) associated with the pedestrian 206(4), as the pedestrian 206(4) move slower and occupies less physical space than the vehicle 206(1).

In some instances, the probability distributions 210(1)-(4) may further indicate that portions of the range that have a higher probability of occurring than other portions of the range. For example, in the illustrated example, each probability distributions 210(1)-(4) includes three ranges or zones, each zone may be associated with a different probability of corresponding object 206(1)-(4) occupying the associated physical space. Alternatively, the probability distributions 210(1)-(4) may include a gradient or range, such as a Gaussian distribution. The vehicle 202 may also determine a probability distribution 208 associated the estimated location of the vehicle 202 itself. For instance, the vehicle 202 may experience errors associated with the navigation components, the perception components, the world map, the sensor data, a combination thereof, as well as from onboard systems. In these cases, the vehicle 202 may also have a range of estimated locations that may be modeled using the probability distribution 208.

The vehicle 202 may next determine a probability of collision between the vehicle 202 and the nearest object 206(1), in the current example, based on an overlap in the probability distribution 210(1) and 208. The vehicle 202 may compare the probability of collision with a threshold to determine if it is safe for the vehicle 202 to proceed along the route 204 as planned. If the vehicle 202 determines that the probability of collision is less than the threshold, the vehicle 202 may navigate along the route 204 to avoid the object 206(1). However, if the probability of collision is equal to or greater than the threshold, the vehicle 202 may attempt to determine one or more parameters or requirement associated with the determining the route 206 that may be updated or changed to reduce the probability of collision between the vehicle 202 and the object 206(1). For example, the vehicle 202 may systemically or randomly perturb selected parameters associated with the route 206 (such as minimum safe distances, velocity, acceleration, etc.) to generate potential new routes. The vehicle 202 may assign or determine additional probabilities of collisions associated with each new route based on the varied or perturbed parameters. In one instance, the vehicle 202 may apply a Monte Carlo type simulation based on the sensor data collected by the vehicle 202, the probability distribution 210(1) and 208, and/or perturb selected parameters to generate the additional probabilities of collisions. In various examples, the number and type of parameters perturbed may be limited to reduce complexity and compute time associated with determining the additional probabilities of collision.

In the current example, it should be understood that the vehicle 202 may determine that additional checks may need to be performed with respect to the objects 206(2)-(4) based on either or both the current route 204 or the additional new routes given the updated or perturbed selected parameters. As such, it should be understood that the vehicle 202 may determine probability distribution 210(1) of the estimated location of the objects 206(1)-(4) at different points in time with different ones of the objects 206(1)-(4) causing the potentially unsafe or policy violating scenario.

Figure 3:
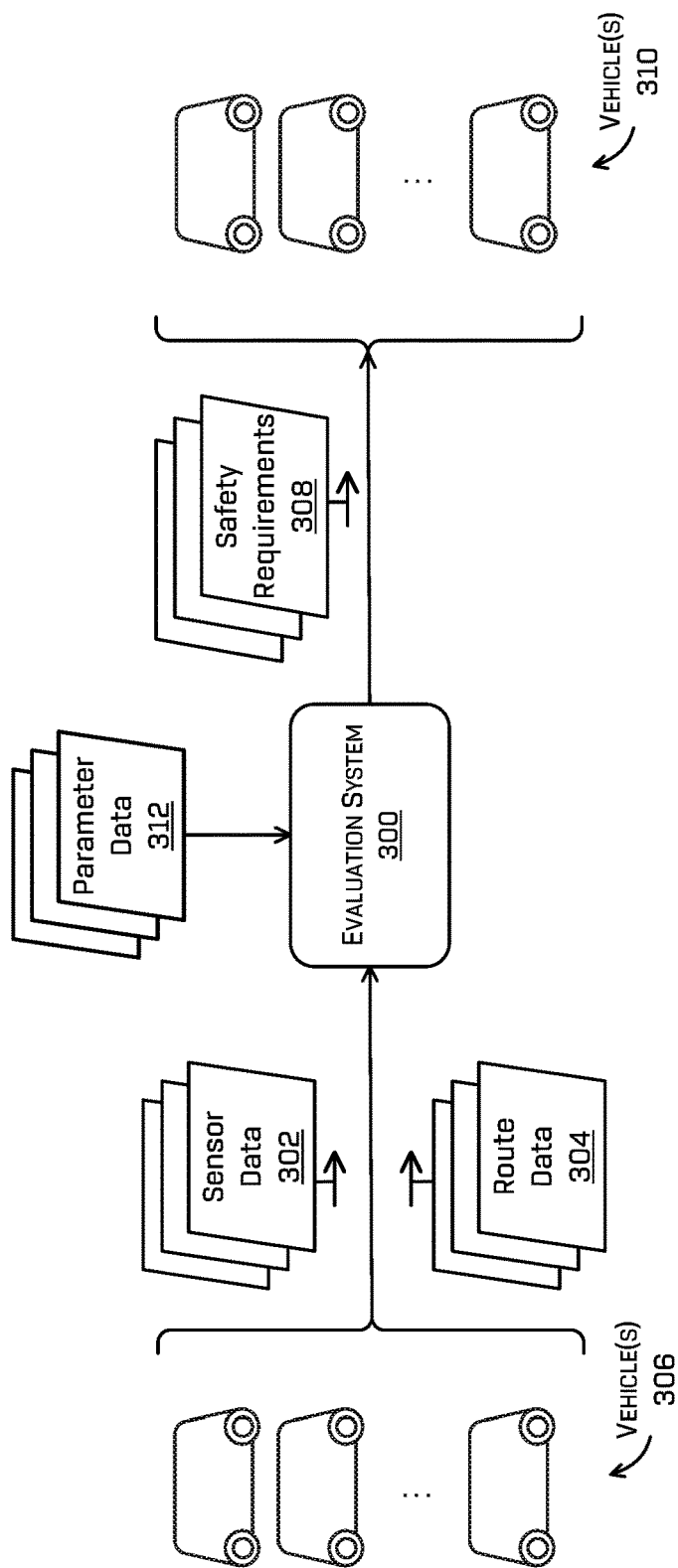
FIG. 3 is an example block-diagram illustrating an example architecture of an evaluation system, in accordance with embodiments of the disclosure.

FIG. 3 is an example block-diagram illustrating an example architecture of an evaluation system 300, in accordance with embodiments of the disclosure. In the illustrated example, the evaluation system 300 may be configured to operate in an offline mode using sensor data 302 and path or route data 304 associated with various situations encountered by multiple vehicles 306 and require the vehicle to deviate from a planned path.

As discussed above, the evaluation system 300 may be configured to identify and evaluate risks associated with the uncertainty represented by the sensor data 302, predicted outcomes for the sensor data 302, and the route data 304. For example, the evaluation system 300 may analyze scenarios represented by the sensor data 302 and the path data 304 in which one of the vehicles 306 deviates from a planned path. When detected, the evaluation prediction system 300 may determine various error models and/or uncertainties determined with respect to the estimated locations, as discussed in more detail below with respect to FIG. 4. In some examples, further details associated with determining error models and/or uncertainties may are discussed in U.S. application Ser. Nos. 16/682,971 and 16/703,625, which are herein incorporated by reference, in their entirety.

The evaluation system may then use the various error models and/or uncertainties to determine probability distributions of estimated locations of objects represented by the sensor data 302 and/or of the vehicle 306 capturing the sensor data 302. The evaluation system 300 may then determine a probability of collision based at least in part on an overlap between the probability distributions of estimated locations of objects and the probability distributions of estimated locations of the vehicle. In situations in which the collision prediction system 300 determines the probability of collision causes the vehicle 306 to be exposed to greater risk than may be necessary, the evaluation system 300 may apply a Monte Carlo type simulation to various parameters associated with the scenario, recalculate the probability distributions of estimated locations of objects and the vehicle 306, and then recalculate the probability of collision based at least in part on the recalculated probability distributions. The evaluation system 300 may then determine a set of safety requirements 308 based on the probability of collision data output by the Monte Carlo simulations. For example, the evaluation system 300 may increase a safe pass distance for the given scenario represented by the sensor data 302 and the path data 304. The evaluation system 300 may then update the safety requirements 308 onboard operating vehicles 310.

In some cases, the evaluation system 300 may also receive parameter data 312. The parameter data 312, may include data associated with parameters such as, but not limited to, acceleration, longitudinal velocity, lateral velocity, safe pass distance, distance or time to potential object, a heading or direction of travel, a speed, and the like. As one example, the parameter data 312 may include limitations on variations of the permutations applied to the parameters as part of the Monte Carlo simulation. For instance, the parameters may be limited based on equipment or components installed on the vehicles 306 and/or 310 (e.g., the sensors resolution may not be increased above a threshold, the prediction system may be unable to reduce uncertainty or error in the estimated locations within a specified period of time below a threshold, among many others). In other instances, various parameters may be weighted, such as based on importance to the given scenario, prior to applying the Monte Carlo simulation.

Figure 4:
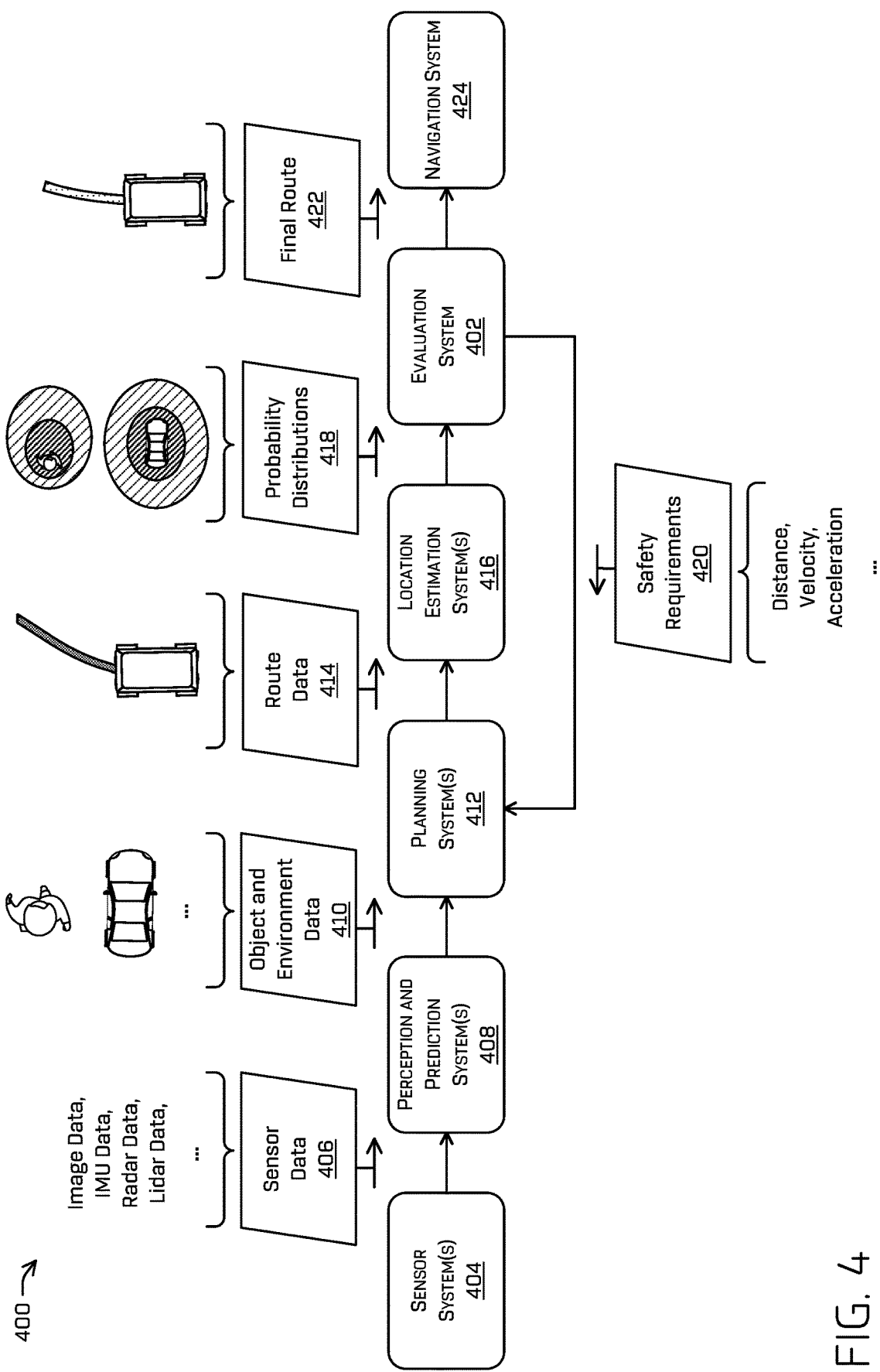
FIG. 4 is an example block-diagram illustrating an example architecture of an evaluation system, in accordance with embodiments of the disclosure.

FIG. 4 is an example block-diagram illustrating an example architecture 400 of an evaluation system 402, in accordance with embodiments of the disclosure. In the current example, the autonomous vehicle may be in operation in the real-world and there may be insufficient time to perform a full simulation with respect to any given scenario to determine an optimal route around an obstruction.

In the illustrated example, a sensor system 404 of the vehicle may capture sensor data 406 of the environment surrounding the vehicle. In at least one example, the sensor system(s) 404 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 404 may include multiple instances of each of these or other types of sensors. For instance, the lidar sensors may include individual lidar sensors located at the corners, front, back, sides, and/or top of the vehicle. As another example, the camera sensors may include multiple cameras disposed at various locations about the exterior and/or interior of the vehicle.

The sensor data 406 captured by the sensor systems 404 may be provided to a perception and prediction system 408. For instance, the perception system may perform classification, segmentation, and/or otherwise process the sensor data 406 to identify one or more objects, such as the objects illustrated with respect to FIGS. 1 and 2, within the environment surrounding the vehicle. In some cases, the perception and prediction system 408 may perform object segmentation, feature extraction, sparse features representation, pattern detection, white space detection, pixel correlation, feature mapping, etc. and utilize one or more neural networks, deep learning, and/or regression techniques to detect, classify, and predict a motion path of the object. For example, details of classification and/or segmentation are discussed in U.S. application Ser. Nos. 16/238,475 and 16/732,243, which are herein incorporated by reference in their entirety. The output of the perception and prediction system 408 may include object and environment data 410, such as type of the objects, classification of the objects, characteristics of the objects, predicted trajectory of the objects, etc.

The object and environment data 410 may be received by a planning system 412. The planning system 412 may determine that one or more of the objects may obstruct the planned path of the vehicle and to generate route data 414 associated with a route that may deviate from the planned path but causes the vehicle to avoid the object. For example, details of path and route planning by the planning system 412 are discussed in U.S. application Ser. Nos. 16/805,118 and 15/632,208, which are herein incorporated by reference, in its entirety.

The route data 414 may be received by the location estimation systems 416. The location estimation systems 416 may then determine or predict a location of one or more of the objects. For example, the location estimation systems 416 may generate an estimated location and a probability distribution 418 for each estimated location of each object. For example, the location estimation system 416 may analyze or process the characteristics or parameters associated with the type of object detected, features of the physical environment, known uncertainties and/or errors associate with the sensors, perception system, prediction system, and/or planning system of the vehicle to determine the probability distributions of the object and/or the vehicle based on a likelihood that the object or vehicle may occupy a given physical location at a specific time at which the vehicle is nearest in physical proximity to the object. For example, details of generating probability distribution associated with estimated locations are discussed in U.S. application Ser. No. 16/682,971, which is herein incorporated by reference, in its entirety.

The evaluation system 402 may receive the probability distributions 418 for the objects and/or the vehicle and determine a probability of collision based on an overlap between the probability distributions of the estimated location of the objects and the probability distributions of the estimated location of the vehicle. In some cases, the collision system 402 may determine the route 414 is unsafe based at least in part on the probability of collision. For example, details associated with identifying unsafe or policy violating scenarios or events are discussed in U.S. application Ser. No. 16/703,625, which is herein incorporated by reference, in its entirety.

In the current example, if the evaluation system 402 determines that the route 414 is unsafe, the evaluation system 402 may implement a Monte Carlo simulation on at least one parameter associated with the route 414 to determine scenario-based updated safety requirements 420. The scenario-based updated safety requirements 420 may be provided back to the planning system 412, such that the planning system 412 may determine a new route given the current scenario and the new route may be evaluated for safety, as discussed above.

Once the evaluation system 402 identifies a safe route (e.g., a route meeting or exceeding one or more safety criterion), a final route 422 may be provided to a navigation system 424. The navigation system 424 may then cause the vehicle to proceed along the final route 424 and eventually return to the planned path, such that the vehicle may resume normal operations.

Figure 5:
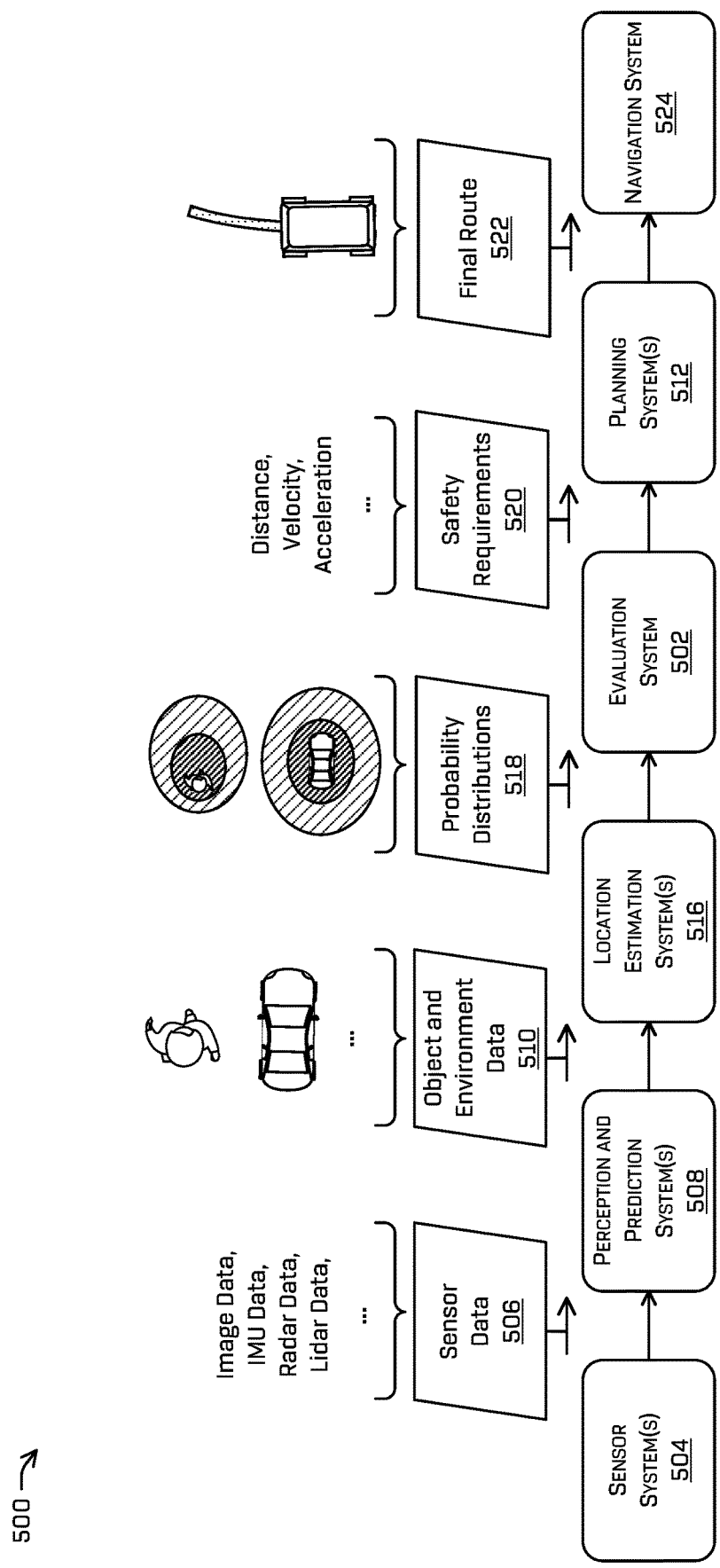
FIG. 5 is an example block-diagram illustrating an example architecture of an evaluation system, in accordance with embodiments of the disclosure

FIG. 5 is another example block-diagram illustrating an example architecture 500 of an evaluation system 502, in accordance with embodiments of the disclosure. In the current example, the autonomous vehicle may be in operation in the real-world and there may be insufficient time to perform a full simulation with respect to any given scenario to determine an optimal route around an obstruction.

In the illustrated example, a sensor system 504 of the vehicle may capture sensor data 506 of the environment surrounding the vehicle. In at least one example, the sensor system(s) 504 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 504 may include multiple instances of each of these or other types of sensors. For instance, the lidar sensors may include individual lidar sensors located at the corners, front, back, sides, and/or top of the vehicle. As another example, the camera sensors may include multiple cameras disposed at various locations about the exterior and/or interior of the vehicle.

The sensor data 506 captured by the sensor systems 504 may be provided to a perception and prediction system 508. For instance, the perception system may perform classification, segmentation, and/or otherwise process the sensor data 506 to identify one or more objects, such as the objects illustrated with respect to FIGS. 1 and 2, within the environment surrounding the vehicle. In some cases, the perception and prediction system 508 may perform object segmentation, feature extraction, sparse features representation, pattern detection, white space detection, pixel correlation, feature mapping, etc. and utilize one or more neural networks, deep learning, and/or regression techniques to detect, classify, and predict a motion path of the object. For example, details of classification and/or segmentation are discussed in U.S. application Ser. Nos. 16/238,475 and 16/732,243, which are herein incorporated by reference in their entirety. The output of the perception and prediction system 408 may include object and environment data 510, such as type of the objects, classification of the objects, characteristics of the objects, predicted trajectory of the objects, etc.

The object and environment data 510 may be received by the location estimation systems 516 may generate an estimated location and a probability distribution 518 for each estimated location of each object. For example, the location estimation system 516 may analyze or process the characteristics or parameters associated with the type of object detected, features of the physical environment, state of the vehicle (geographic location, velocity, acceleration, rotations, etc.), known uncertainties and/or errors associate with the sensors, perception system, prediction system, and/or planning system of the vehicle to determine the probability distributions of the object and/or the vehicle based on a likelihood that the object or vehicle may occupy a given physical location at a specific time at which the vehicle is nearest in physical proximity to the object. For example, details of generating probability distribution associated with estimated locations are discussed in U.S. application Ser. No. 16/682,971, which is herein incorporated by reference, in its entirety. In at least some examples, such errors and/or uncertainties may be determined based on a look-up table, machine learned model, or otherwise determined based on the techniques disclosed herein.

The evaluation system 502 may receive the probability distributions 518 for the objects and/or the vehicle and determine a probability of collision based on an overlap between the probability distributions of the estimated location of the objects and the probability distributions of the estimated location of the vehicle. For example, details associated with identifying unsafe or policy violating scenarios or events are discussed in U.S. application Ser. No. 16/703,625, which is herein incorporated by reference, in its entirety.

In the current example, if the evaluation system 502 determines that one or more parameters associated with a maneuver associated with the object or the situation causing the policy volition is unsafe, the evaluation system 402 may implement a Monte Carlo simulation on at least one parameter associated with the maneuver to determine scenario-based updated safety requirements 520. The scenario-based updated safety requirements 520 may be provided to the planning system 512, such that the planning system 512 may utilize the safety requirement 420 when and if a vehicle encounters a route given the current scenario that is potentially unsafe due to the detected object or the policy violation. In at least some examples, such outputs may be pre-computed and stored such that during driving operations, the vehicle relies on the pre-computed values without performing such simulations.

If the scenario is encountered, the planning system 512 may utilize the safety requirements 520 to determine a route 522 that may be executed by the navigation system 524 to cause the vehicle to proceed pass the policy unsafe or policy violating scenario.

Figure 6:
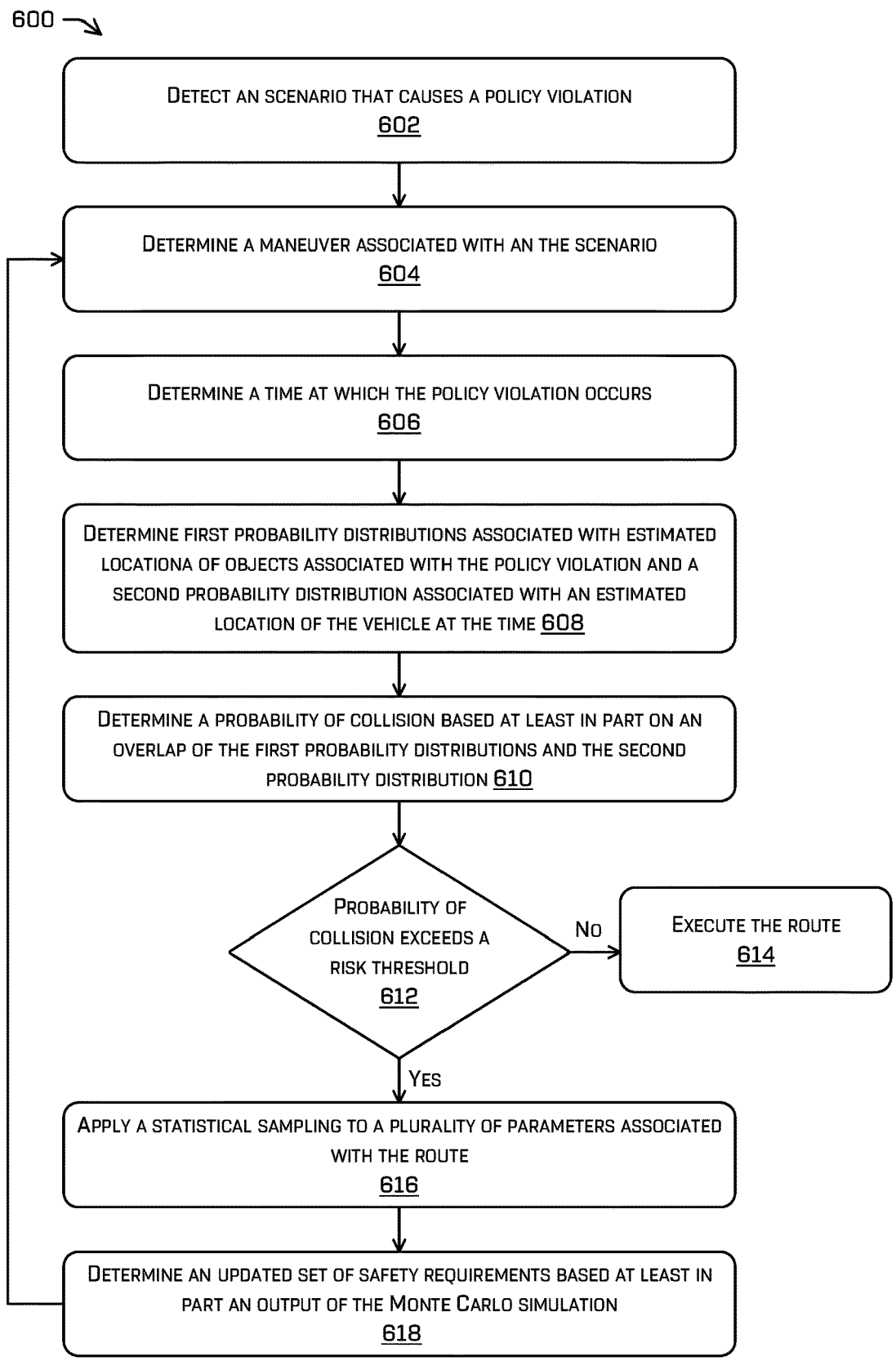
FIG. 6 is a flow diagram illustrating an example process associated with the evaluation system of FIGS. 4 and 5, in accordance with embodiments of the disclosure.
Figure 7:
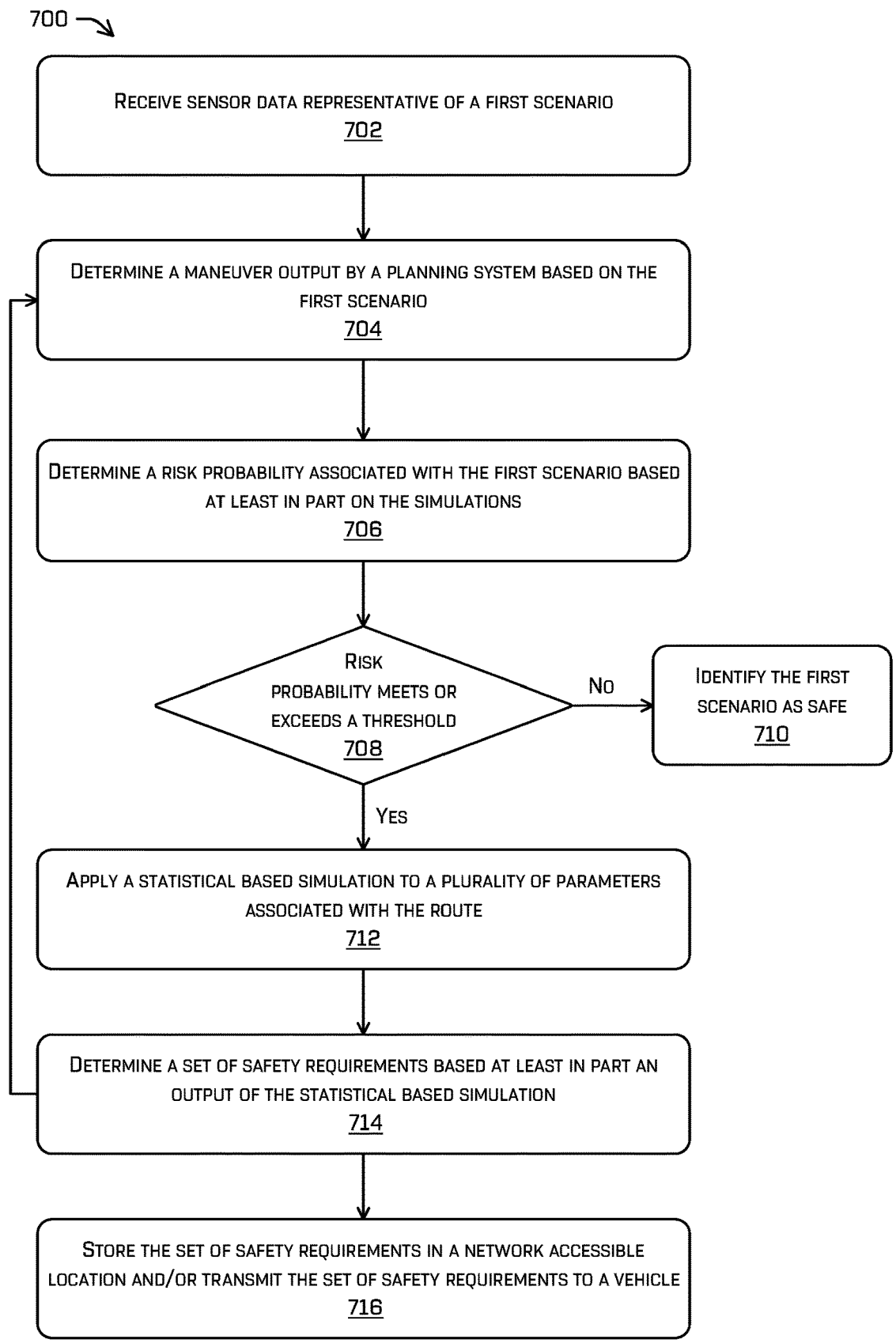
FIG. 7 is another flow diagram illustrating an example process associated with the evaluation system of FIGS. 4 and 5, in accordance with embodiments of the disclosure.

FIGS. 6 and 7 are flow diagrams illustrating example processes associated with the collision prediction system discussed above. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 6 is a flow diagram illustrating an example process 600 associated with the evaluation system, in accordance with embodiments of the disclosure. As discussed above, in some situations, an autonomous vehicle may encounter a scenario or event in which the vehicle is required to navigate away from a planned path, such as when the planned path is blocked or the planned path potentially may become blocked, and the like. In these cases, the vehicle may be equipped with a collision prediction system or component to assist in determining if a route deviating from the planned path and avoiding the obstruction falls within determined safety requirements.

At 602, the vehicle may detect a scenario that causes a policy violation. For example, the vehicle may detect an object obstructing (or potentially obstructing) a planned path of the vehicle. For example, the perception system of the vehicle may process sensor data associated with the surrounding environment to detect the object as well as various characteristics or attributes of the object. In some situations, the object may be along the planned path of the vehicle, such as a parked vehicle or construction detour.

At 604, a planning system of the vehicle may determine a maneuver associated with the scenario. For example, the maneuver may be a route to avoid the object. For example, the planning system may receive the object data output by the perception system and generate a route based at least in part on the planned path, a map of the environment, and the output of the perception system. For example, details associated with planning system for the autonomous vehicle are discussed in U.S. application Ser. Nos. 16/011,436 and 16/246,208, which are herein incorporated by reference, in its entirety.

At 606, the vehicle may determine a time at which the policy violation occurs. For example, the vehicle may determine a time (e.g., a timestamp) in which the vehicle is or will be closest physical proximity to the obstructing object along the route. For example, the vehicle may predict the vehicles position along the route and determine a time in which the vehicle would be closest to the object. In the case of multiple objects, the vehicle may determine a time at which the vehicle is closet to any of the objects detected.

At 608, the vehicle may determine probability distributions associated with estimated locations of objects associated with the policy violation and a second probability distribution associated with an estimated position of the vehicle. For example, using error and/or machine learned models, the vehicle may then determine the first probability distribution of the obstructing object using a type of the obstructing object, a current location of the obstructing object, a velocity of the obstructing object, a direction of travel of the obstructing object, an acceleration of the obstructing object and/or the like as inputs to the model. Likewise, the vehicle may determine the second probability distribution of the vehicle using a current location of the vehicle, maneuver data, route data, a velocity of the vehicle, a direction of travel of the vehicle, an acceleration of the vehicle and/or the like as inputs to the model. In some cases, the vehicle may determine the probability distribution of the estimated locations of the obstructing object and/or vehicle at the future time (e.g., prior to navigation the route). In some examples, the first and/or second probability distribution may be binned into multiple discrete probabilities. For example, 8 meters per second and 12 meters per second may be associated with a 5% probability, 9 meters per second and 11 meters per second may be associated with a 20% percent probability, and 10 meters per second may be associated with a 45% probability. In other cases, the estimated locations may correspond to a probability distribution, such as a Gaussian distribution of locations determined based at least in part on known or estimated error associated with the vehicle sensors, prediction system, planning system, store or accessible map data, and the like.

At 610, the vehicle may determine a probability of collision based at least in part on the overlap of the first probability distributions and the second probability distribution. For example, the probability of collision between the vehicle and the obstructing object may be computed using an area of geometric overlap between the probability distributions of the estimated locations. In some instances, if there are multiple objects detected within the environment, the vehicle may determine a total probability of collision associated with the maneuver and/or route using the determined probability of collisions for each of the objects. For example, the total probability of collision may include the sum of the probability of collisions for each of the objects at a time along the route in which the vehicle is physically nearest each object.

At 612, the vehicle may determine if the probability of collision exceeds a risk threshold. For example, one or more risk thresholds may be a safety threshold that is set or determined by a remote operator of the vehicle. In some cases, the risk threshold may be determined using various simulations or models prior to the vehicle operating within the physical environment. If the probability of collision does not exceed the risk threshold (e.g., is less than or equal to the risk threshold), the process 600 advances to 614, and the vehicle may execute or navigate along the route. However, if the risk threshold is exceeded, the process 600 proceeds to 616.

At 616, the vehicle may apply a statistical sampling to a plurality of parameters associated with the route. For instance, the vehicle may select particular parameters, such as safe passing distance, vehicle velocity, among others, to vary during a Monte Carlo simulation to determine probability of collision with respect to the various changes in parameters.

At 618, the vehicle may determine an updated set of safety requirements based at least in part on an output of the statistical sampling (e.g., the Monte Carlo simulation). For example, the set of safety requirements may include updated parameters that may be provided as an input into the planning system to determine an updated or new route around the object or objects obstructing the vehicle's planned path. For instance, the updated set of safety requirements may include an increased pass distance, a reduction in velocity when passing, a reduction in acceleration while passing, and the like. In this manner, the vehicle is better able to avoid potentially unsafe or policy violating scenarios while traveling along the roads.

FIG. 7 is another flow diagram illustrating an example process 600 associated with the evaluation system, in accordance with embodiments of the disclosure. As discussed above, in some cases, a set of safety requirements may be identified for a given scenario by analyzing and training models using sensor data captured by one or more autonomous vehicles operating in real-world environment. The set of safety requirements may then be used by planning systems onboard the vehicle to determine a safe route when the corresponding scenario is encountered.

At 702, a training or machine learning system or component may receive sensor data representative of a first scenario. In some cases, the sensor data may be received or compiled from a plurality or multiple vehicles. In other cases, the sensor data may be simulated or output by a machine learned model trained to output simulated environment data. The training or machine learning system may first determine if the scenario is a known safe scenario or if the scenario is a potentially unsafe or policy violating scenario. If the scenario is potentially unsafe, the process 700 may proceed to 704.

At 704, the training or machine learning system may determine or predict a maneuver output by a planning system of the autonomous vehicle based at least in part on the sensor data representing the first scenario. For example, the system may segment and classify the sensor data to identify objects within the sensor data and then determine a maneuver and/or route through or around the objects. The system may then determine a route based on the sensor data and a set of safety requirements associated with the first scenario.

At 706, the training or machine learning system may determine a risk probability associated with the first scenario based at least in part on the simulations. For example, the system may determine a probability distribution associated with an estimated location of any objects present in the scenario and a probability distribution associated with an estimated position of the vehicle as the vehicle executes the maneuver. The system may also determine a probability of collision for each object based at least in part on the overlap of the probability distribution of each object and the probability distribution of the vehicle as the vehicle passes each object. In some cases, the risk probability may be a sum (or weighted sum) of the probability of collisions for each of the objects.

At 708, the training or machine learning system may determine if the risk probability meets or exceeds a threshold. If the risk probability does not meet or exceed the threshold, the process 700 may advance to 710 and the system may identify the first scenario as safe. In other words, the vehicle or vehicles associated with the training or machine learning system may operate safely when encountering the first scenario in the real-world using the set of safety requirements corresponding to the route. However, if the risk probability meets or exceeds the threshold, the process 700 may proceed to 712.

At 612, the training or machine learning system may apply statistical based simulations to the first scenario. For example, the system may apply a Monte Carlo simulations may be tuned to take into account perception errors (e.g., errors within the sensor data and/or in the predicted locations, characteristics, and/or type of object). For example, the system may apply various perception error values as an input to the Monte Carlo simulation to receive an output that may be used to determine a risk probability associated with each perception error value.

In one specific example, the training or machine learning system may utilize a Monte Carlo simulation or tree search to organize and search through possible parameters associated with the route, while using temporal logic formulas to verify whether the possible routes improve the overall safety or reduce the risk of collision, for example, and determining various costs and constraints associated with possible values of each parameter to select a value or each parameter to optimize safety. In some examples, for various parameters associated with the route, a cost function can penalize select features of the vehicle such as acceleration, distance to object, jerk, lateral acceleration, yaw, steering angle, steering angle rate, etc. In some implementations, the Monte Carlo simulation may be considered a general heuristic search algorithm or technique that forms the basis of a large family of possible simulation algorithms. Such an algorithm may be performed on discrete sets of data, as well as in continuous domains by incorporating various modifications.

At 714, the training or machine learning system may determine a determine a set of requirements based at least in part on the output of the statistical based simulation. For example, the system may determine a risk probability associated with different perception error values as well as different parameters associated with the operations of the vehicle, such as pass distance, velocity, acceleration, etc. In some cases, the risk probability may be output as a table including the probability of collision or risk probability given each varied input (e.g., perception error values and/or operational parameters). The output may then be used to select a set of safety requirements (e.g., simulated parameters) for different types or models of vehicles having differing levels or amounts of perception error (e.g., sensor error, prediction error, etc.).

At 716, the training or machine learning system may store the set of safety requirements in a network accessible location and/or transmit the set of safety requirements to a vehicle. For example, the set of safety requirements may be added or inserted into a look-up table that is accessible to or stored on each vehicle for access when a potentially unsafe or policy violating scenario is encountered.

Figure 8:
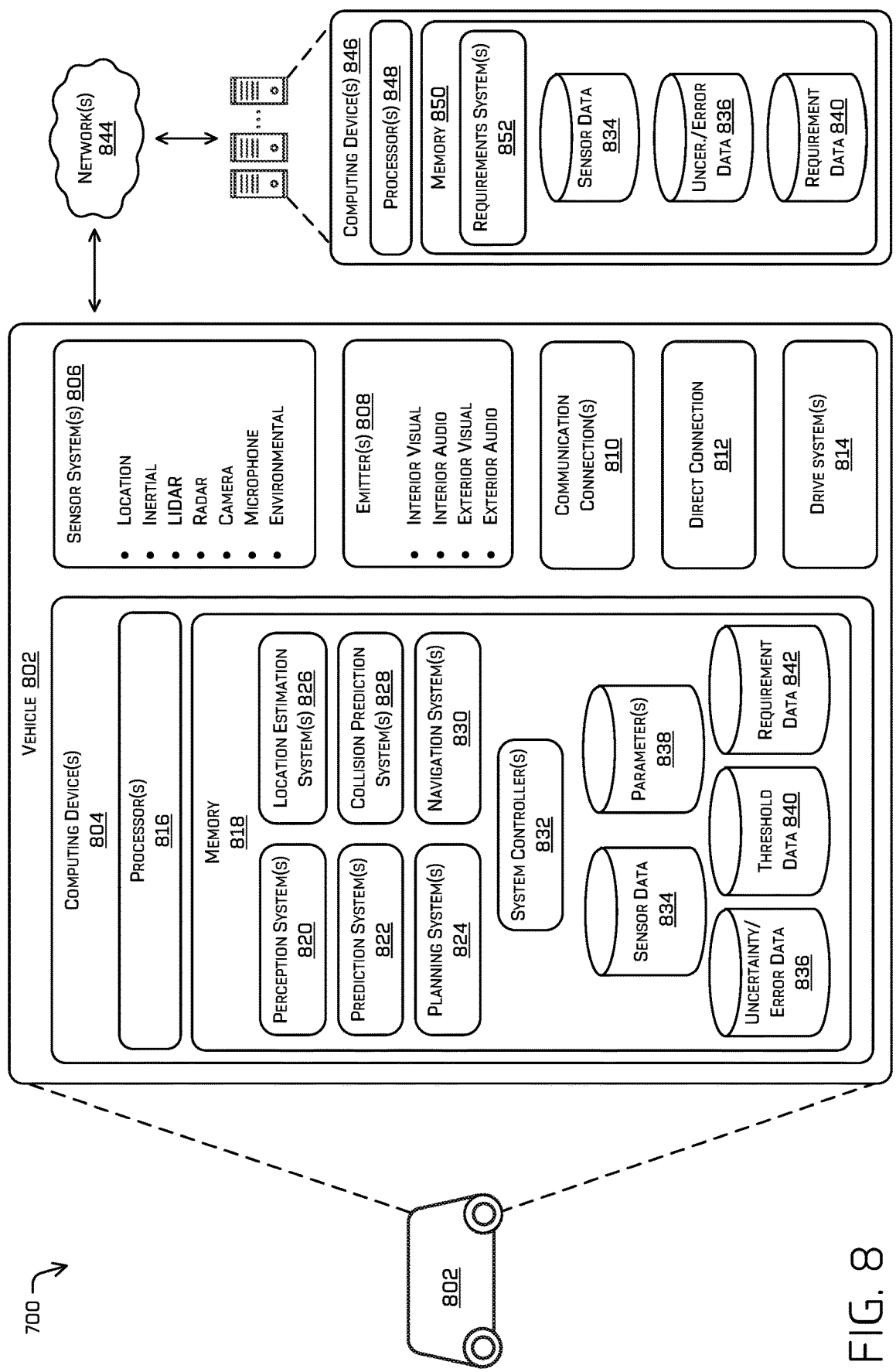
FIG. 8 depicts a block diagram of an example system for implementing the techniques discussed herein.

FIG. 8 depicts a block diagram of an example system 800 for implementing the techniques discussed herein. In at least one example, the system 800 may include a vehicle 802, such the autonomous vehicles discussed above. The vehicle 802 may include computing device(s) 804, one or more sensor system(s) 806, one or more emitter(s) 808, one or more communication connection(s) 810 (also referred to as communication devices and/or modems), at least one direct connection 812 (e.g., for physically coupling with the vehicle 802 to exchange data and/or to provide power), and one or more drive system(s) 814. The one or more sensor system(s) 806 can be configured to capture the sensor data 836 associated with a surrounding physical environment.

In at least some examples, the sensor system(s) 806 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 806 may include multiple instances of each type of sensors. For instance, time-of-flight sensors may include individual time-of-flight sensors located at the corners, front, back, sides, and/or top of the vehicle 802. As another example, camera sensors may include multiple cameras disposed at various locations about the exterior and/or interior of the vehicle 802. In some cases, the sensor system(s) 806 may provide input to the computing device(s) 804.

The vehicle 802 may also include one or more emitter(s) 808 for emitting light and/or sound. The one or more emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 808 in this example also includes exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 802 can also include one or more communication connection(s) 810 that enable communication between the vehicle 802 and one or more other local or remote computing device(s) (e.g., a remote teleoperations computing device) or remote services. For instance, the communication connection(s) 810 can facilitate communication with other local computing device(s) on the vehicle 802 and/or the drive system(s) 814. Also, the communication connection(s) 810 may allow the vehicle 802 to communicate with other nearby computing device(s) (e.g., other nearby vehicles, traffic signals, etc.).

The communications connection(s) 810 may include physical and/or logical interfaces for connecting the computing device(s) 802 to another computing device or one or more external network(s) 844 (e.g., the Internet). For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 810 may comprise the one or more modems as described in detail above.

In at least one example, the vehicle 802 may include one or more drive system(s) 814. In some examples, the vehicle 802 may have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include one or more sensor system(s) 806 to detect conditions of the drive system(s) 814 and/or the surroundings of the vehicle 802. By way of example and not limitation, the sensor system(s) 806 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 814. In some cases, the sensor system(s) 802 on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which may receive and preprocess data from the sensor system(s) 806 and to control operation of the various vehicle systems. In some examples, the drive system controller can include one or more processor(s) and memory communicatively coupled with the one or more processor(s). The memory can store one or more modules to perform various functionalities of the drive system(s) 814. Furthermore, the drive system(s) 814 also include one or more communication connection(s) that enable communication by the respective drive system with one or more other local or remote computing device(s).

The computing device(s) 804 may include one or more processors 816 and one or more memories 818 communicatively coupled with the processor(s) 816. In the illustrated example, the memory 818 of the computing device(s) 804 stores perception systems(s) 820, prediction systems(s) 822, planning systems(s) 824, location estimation systems(s) 826, evaluation systems(s) 828, navigation systems(s) 830, as well as one or more system controller(s) 832. The memory 818 may also store data such as sensor data 834 captured or collected by the one or more sensors systems 806, uncertainty/error data 836 associated with the systems and components of the vehicle 802, parameters 838 associated with generating routes, threshold data 840 (e.g., various safety related thresholds), and requirement data 842 (e.g., safety requirements determined specific scenarios when encountered by the vehicle 802). Though depicted as residing in the memory 820 for illustrative purposes, it is contemplated that the perception systems(s) 820, the prediction systems(s) 822, the planning systems(s) 824, the location estimation systems(s) 826, the evaluation systems(s) 828, the navigation systems(s) 830, and the system controller(s) 832 may additionally, or alternatively, be accessible to the computing device(s) 804 (e.g., stored in a different component of vehicle 802 and/or be accessible to the vehicle 802 (e.g., stored remotely).

The perception system 820 may be configured to perform object detection, segmentation, and/or classification on the sensor data 834. In some examples, the perception system 820 may generate processed sensor data that indicates a presence of objects that are in physical proximity to the vehicle 802 and/or a classification or type of the objects (e.g., car, pedestrian, cyclist, building, tree, road surface, curb, sidewalk, unknown, etc.). In additional and/or alternative examples, the perception system 820 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another objects, a time of day, a weather condition, a geographic position, an indication of darkness/light, etc.

The prediction system 822 may be configured to determine a track corresponding to an object identified by the perception system 820. For example, the prediction system 822 may be configured to predict a velocity, position, change in trajectory, or otherwise predict the decisions and movement of the identified objects. For example, the prediction system 822 may include one or more machine learned models that may based on inputs such as object type or classification and object characteristics output predicted characteristics of the object at one or more future points in time.

The planning system 824 may be configured to determine a route for the vehicle 802 to follow to traverse through an environment. For example, the planning system 824 may determine various routes and paths and various levels of detail based at least in part on the objects detected, the predicted characteristics of the object at future times, and a set of safety requirements corresponding to the current scenario (e.g., combination of objects detected and/or environmental conditions). In some instances, the planning system 824 may determine a route to travel from a first location (e.g., a current location) to a second location (e.g., a target location) in order to avoid an object obstructing or blocking a planned path of the vehicle 802. In some case, a route can be a sequence of waypoints for traveling between the two locations (e.g., the first location and the second location). In some cases, waypoints include streets, intersections, global positioning system (GPS) coordinates, etc.

In at least one example, the planning system 824 may determine how to guide the vehicle 802 along the route. In some examples, planning system 824 may determine the course, direction, velocity, acceleration, etc. associated with traversing the route avoiding the objects. In some examples, the planning system 824 may determine the route using requirement or tolerances (e.g., the requirement data 840) associated with the currently encountered scenario, such as pass distances, velocity thresholds, etc. In other words, the requirement data 842 may be scenario specific safety settings or parameters suable by the planning system 824 in defining the route for the vehicle 802 to navigate around the detected objects.

The location estimation system 826 may generate one or more probability distributions representing estimated locations of one or more objects detected in an environment as well as estimated locations of the vehicle 802. For example, the location estimation system 826 may generate probability distributions based on the classification or type of object, characteristics or future characteristics of the object, characteristics of the vehicle, the uncertainty/error data 836 associated with the components of the vehicle 802, and/or the sensor data 834.

In some instances, the probability distributions representing estimated locations of the objects and/or vehicle may be a continuous distribution such as a Gaussian distribution, weighted distribution (e.g., weighted based on certainty of predicted characteristics or motion of the object), or other probability density functions in which each point in the distribution may contain a different probability associated with the estimated location. In other cases, the probability distributions may include discretized regions or zones (such as the three regions illustrated herein in FIG. 2) in which each region may contain a corresponding probability associated with the estimated location.

The evaluation system 828 may be configured to access or receive the probability distributions associated with the estimated locations of the objects and/or the vehicle from the location estimation system 826 as well as the route from the planning system 824. The evaluation system 828 may determine a probability of collision based on an overlap between the probability distributions of the estimated location of the objects and the probability distributions of the estimated location of the vehicle 802 at a point in time in which the vehicle 802 is predicted to be nearest each object. In some cases, the evaluation system 828 may determine the route is unsafe based at least in part on the probability of collision and the threshold data 840.

In some instances, if there are multiple objects detected within the environment by the perception system 820 and the prediction system 822, the evaluation system 828 may determine a total probability of collision associated with the route using the determined probability of collisions for each of the objects. For example, the total probability of collision may include the sum of the probability of collisions for each of the objects at a time along the route in which the vehicle is physically nearest each object. In some cases, the sum may be weighed sum based on a confidence associated with the overlap between the probability distributions.

If the evaluation system 828 determines that the route is unsafe, the evaluation system 828 may implement a Monte Carlo simulation on at least one of the parameters associated with planning the route to updated safety requirement data 842 associated with the current scenario. The evaluation system 828 may then cause the planning system 824 to generate a new route based at least in part on the updated safety requirements.

In at least one example, the computing device(s) 802 may store one or more navigation systems 830 and/or system controllers 832, which may be configured to control steering, propulsion, braking, safety, emitters, communication, and other systems of the vehicle 802. The navigation systems 830 and/or system controllers 832 may communicate with and/or control corresponding systems of the drive system(s) 814 and/or other components of the vehicle 802, which may be configured to operate in accordance with a route provided from the planning system 824.

In some implementations, the vehicle 802 may connect to computing device(s) 844 via the network(s) 844. The computing device 846 may include one or more processors 848 and memory 850 communicatively coupled with the one or more processors 848. In at least one instance, the processor(s) 848 may be similar to the processor(s) 848 and the memory 850 may be similar to the memory 818. In the illustrated example, the memory 850 of the computing device(s) 846 stores the senor data 834 received from one or more vehicles, the uncertainty/error data 836 associated with the vehicle 802 to develop or generate the requirement data 842. For example, the memory 850 may also store a requirements system 852 configured to generate the requirement data 842 for each scenario detected by one or more of the vehicles 802.

The requirements system 852 may segment and classify the sensor data 834 to identify objects within the sensor data 834 and then determine a route through or around the objects. The requirements system 852 may then generate data representing a scenario based at least in part on the sensor data 834. For example, the requirements system 852 may associated similar or related sensor data 834 received from different vehicles 802 based on the location, number, and classification of the objects as well as a similarity in the physical environment.

The requirements system 852 may then determine a route associated with the scenario based on the sensor data 834 and characteristics of a selected vehicle type. The requirements system 852 may also determine a risk probability associated with the scenario based at least in part probability associated with an estimated location of any objects present in the scenario and a probability distribution associated with an estimated position of the vehicle as the vehicle traverse the route, as discussed above. The requirements system 852 may vary parameters associated with the vehicle and/or route (including upgrading the equipment and components of the vehicle to reduce uncertainty and error) using a Monte Carlo type simulation to determine a risk probability or probability of collision for each variation.

The requirements system 852 may then select a set of requirements for the scenario/vehicle type (e.g., set of vehicles having similar equipment or capabilities) combination to send to the vehicles 802 as the requirement data 842. In some cases, the requirements system 852 may also recommend system upgrades or maintenance for particular type of vehicles (e.g., sensors with improved accuracy, updated software for the perception system 820, the prediction system 822, the planning system 824, etc.) among other types of upgrades.

In some implementations, the requirements system 852 may include training component, a machine learning component, as well as training data. The training component may generate the training data using the sensor data received from one or more vehicles. For instance, the training component may label data representative of an object with one or more measured parameters or characteristics of the object in the image. The training component may then use the training data to train the machine learning component to predict motion states of predict current or future speed, trajectory, and/or any other characteristics of objects based on pose of the object depicted in sensor data. The requirements system 852 may then utilize the models. learned parameters, and/or trained data to assist with generating the set of recruitments for each simulated scenario as discussed above.

The processor(s) 816 of the computing device(s) 802 and the processor(s) 848 of the computing device(s) 846 may be any suitable processor capable of executing instructions to process data and perform operations as described herein. By way of example and not limitation, the processor(s) 816 and 848 may comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 818 of the computing device(s) 802 and the memory 818 of the computing device(s) 846 are examples of non-transitory computer-readable media. The memory 818 and 850 can store an operating system and one or more software applications, instructions, programs, and/or data to implement the methods described herein and the functions attributed to the various systems. In various implementations, the memory 818 and 850 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 818 and 850 can be implemented as a neural network.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 8 may utilize the processes and flows of FIGS. 1-7.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. An system comprising: one or more sensors; one or more processors; and one or more computer-readable media storing instructions that, when executed by the one or more processors, cause the one or more processors to perform operations comprising: receiving sensor data from the a sensor associated with an autonomous vehicle traversing an environment; identifying a first object represented by the sensor data; determining a first route for the autonomous vehicle based at least in part on a set of parameters; determining an estimated location associated with the first object; determining an estimated location associated with the autonomous vehicle; determining, based at least in part on a first error model, a first probability distribution associated with the estimated location of the first object; determining, based at least in part on a second error model, a second probability distribution associated with the estimated location of the autonomous vehicle; determining, based at least in art on the first and second probability distributions, a probability of collision; determining that the probability of collision is greater than a threshold; updating a parameter of the set of parameters; and transmitting the set of parameters to a location accessible by the autonomous vehicle.

B. The system of claim A, wherein updating the parameter further comprises: applying a statistical sampling technique over a set of parameters; and determining, based at least in part on the statistical sampling technique, a value for the parameter, wherein the value for the parameter is associated with an instance of the statistical sampling technique outputting a probability of collision less than or equal to the threshold.

C. The system of claim A, further comprising: determining a second route for the autonomous vehicle to avoid the first object based at least in part on the set of parameters.

D. The system of claim A, wherein the first error model and the second error model are determined based at least in part from a predicted uncertainty associated with sensor data, the estimated location of the first object, and determining an estimated location associated with the autonomous vehicle.

E. A method comprising: identifying a situation represented by sensor data captured from a sensor associated with a first vehicle; determining, based at least in part on a first error model, a first probability distribution associated with an estimated location of a first object; determining, based at least in part on a second error model, a second probability distribution associated with an estimated location of the first vehicle; determining a risk probability associated with the situation based at least in part the first probability distribution and the second probability distribution; updating a set of parameters based at least in part on a comparison of the risk probability to a threshold; and storing the set of parameters at a location accessible to at least one of the first vehicle or a second vehicle.

F. The method of paragraph E, further comprising: determined an approximation of uncertainty associated with the sensor data based at least in part on the first error model and at least one feature of the situation; and wherein the first probability distribution is based at least in part on the approximation of uncertainty associated with the sensor data.

G. The method of paragraph E, wherein the risk probability is a probability of collision between the vehicle and the first object.

H. The method of paragraph E, wherein updating the set of parameters further comprises modifying at least one safety distance associated with the first vehicle, a velocity of the first vehicle, or an acceleration of the first vehicle.

I. The method of paragraph H, wherein updating the set of parameters includes applying a statistical sampling technique to values of the set of parameters and the sensor data.

J. The method of paragraph E, wherein: the first probability distribution is determined based on error or uncertainty associated with the estimated location of the first object; and the second probability distribution determined based on error or uncertainty associated with the estimated location of the vehicle.

K. The method of paragraph E, further comprising: determining, based at least in part on the first error model, a third probability distribution associated with an estimated location of a second object; determining that the first object is physically closer to the vehicle than the second object; and wherein determining the risk probability associated with the situation based at least in part the first probability distribution and the second probability distribution is in response to determining that the first object is physically closer to the vehicle than the second object.

L. The method of paragraph E, further comprising: determining a point associated with the first route at which the first vehicle is predicted to be nearest in physical proximity to the object comprising determining a point of time; and wherein determining the first probability distribution and the second probability distribution is at the point in time.

M. The method of paragraph E, further comprising: determining a maneuver associated with the first vehicle based on the set of parameters; and transmitting the maneuver to the first vehicle.

N. A non-transitory computer-readable medium storing instructions that, when executed, cause one or more processors to perform operations comprising: identifying a first object represented by sensor data captured from a sensor in an environment; determining, based at least in part on a first error model, a first probability distribution associated with an estimated location of the first object; determining, based at least in part on a second error model, a second probability distribution associated with an estimated location of the sensor in the environment; determining a first probability based at least in part the first probability distribution and the second probability distribution; updating a set of parameters based at least in part on a comparison of the first probability to a threshold; and transmitting the set of parameters to a vehicle.

O. The non-transitory computer-readable medium of paragraph N, wherein the first probability distribution and the second probability distribution are determined at a point in time at which the sensor is in closet physical proximity to the first object.

P. The non-transitory computer-readable medium of paragraph N, wherein the vehicle is configured to alter a maneuver based at least in part on the set of parameters.

Q. The non-transitory computer-readable medium of paragraph N, wherein the first probability is associated with a likelihood of a collision between the first object.

R. The non-transitory computer-readable medium of paragraph N, wherein updating the set of parameters is based at least in part on applying a statistical sampling technique to the set of parameters.

S. The non-transitory computer-readable medium of paragraph N, wherein determining the first probability further comprises determining a geometric overlap between the first probability distribution and the second probability distribution.

T. The non-transitory computer-readable medium of paragraph N, the operations further comprising: identifying a second object represented by the sensor data; determining, based at least in part on the first error model, a third probability distribution associated with a second estimated location of the second object; determining, based at least in part on the second error model, a fourth probability distribution associated with a second estimated location of the sensor; and determining a second probability based at least in part the third probability distribution and the fourth probability distribution, wherein updating the set of parameters is based at least in part on a comparison of a sum of the first probability and the second probability to the threshold.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A system comprising:
   one or more processors; and
   one or more non-transitory computer-readable media storing instructions that, when executed by the one or more processors, cause the one or more processors to perform operations comprising:
   receiving sensor data from a sensor associated with an autonomous vehicle traversing an environment;
   identifying a first object represented by the sensor data;
   determining a first route for the autonomous vehicle based at least in part on a set of parameters;
   determining an estimated location associated with the first object;
   determining a first classification for the first object;
   selecting a first error model from a plurality of differing error models based at least in part on the first classification;
   determining an estimated location associated with the autonomous vehicle; determining, based at least in part on the first error model, a first probability distribution associated with the estimated location of the first object;
   determining, based at least in part on a second error model and at least one parameter associated with the autonomous vehicle, a second probability distribution associated with the estimated location of the autonomous vehicle;
   determining, based at least in part on a plurality of statistical based simulations generated based at least in part on the first probability distribution and the second probability distribution, a probability of collision;
   determining that the probability of collision is greater than a threshold;
   placing a limitation on a variation of a subset of the at least one parameter associated with the autonomous vehicle, and updating the subset of the at least one parameter associated with the autonomous vehicle based at least in part on another plurality of statistical based simulations to reduce the probability of collision to less than or equal to the threshold, wherein the at least one parameter associated with the autonomous vehicle comprises at least one of a safe distance between the first object and the autonomous vehicle, a direction of the autonomous vehicle, a velocity of autonomous vehicle, or an acceleration of the autonomous vehicle; and transmitting a set of parameters including the at least one parameter to a location accessible by the autonomous vehicle.

2. The system as recited in claim 1, wherein updating the subset of the at least one parameter further comprises:

applying a statistical sampling technique over the subset of the at least one parameter; and determining, based at least in part on the statistical sampling technique, a value for the subset of the at least one parameter, wherein the value for the subset of the at least one parameter is associated with an instance of the statistical sampling technique outputting a new probability of collision less than or equal to the threshold.

3. The system as recited in claim 1, further comprising:
determining a second route for the autonomous vehicle to avoid the first object based at least in part on the set of parameters.

4. The system as recited in claim 1, wherein the first error model and the second error model are determined based at least in part from a predicted uncertainty associated with sensor data, the estimated location of the first object, and the estimated location associated with the autonomous vehicle.

5. A method comprising:

identifying a situation represented by sensor data captured from a sensor associated with a first vehicle;

determining a classification of a first object;

selecting, based at least in part on the classification, a first error model from differing error models;

determining, based at least in part on the first error model, a first probability distribution associated with an estimated location of the first object;

determining, based at least in part on a second error model and at least one parameter associated with the first vehicle, a second probability distribution associated with an estimated location of the first vehicle;

determining a risk probability associated with the situation based at least in part on a plurality of statistical based simulations generated based at least in part on the first probability distribution and the second probability distribution;

placing a limitation on a variation of a subset of the at least one parameter associated with the first vehicle, and updating at least the subset of the at least one parameter associated with the first vehicle based at least in part on another plurality of statistical based simulations to reduce the risk probability to less than or equal to a threshold; and storing a set of parameters including the at least one parameter at a location accessible to the first vehicle.

6. The method as recited in claim 5, further comprising:
determining an approximation of uncertainty associated with the sensor data based at least in part on the first error model and at least one feature of the situation, wherein the first probability distribution is based at least in part on the approximation of uncertainty associated with the sensor data.

7. The method as recited in claim 5, wherein the risk probability is a probability of collision between the first vehicle and the first object.

8. The method as recited in claim 5, wherein updating the subset of the at least one parameter further comprises modifying at least one safety distance associated with the first vehicle, a velocity of the first vehicle, or an acceleration of the first vehicle.

9. The method as recited in claim 8, wherein updating the subset of the at least one parameter includes applying a statistical sampling technique to values of the subset of the at least one parameter and the sensor data.

10. The method as recited in claim 5, wherein:
the first probability distribution is determined based on error or uncertainty associated with the estimated location of the first object; and the second probability distribution determined based on error or uncertainty associated with the estimated location of the first vehicle.

11. The method as recited in claim 5, further comprising:
determining, based at least in part on the first error model, a third probability distribution associated with an estimated location of a second object; and determining that the first object is physically closer to the first vehicle than the second object, wherein determining the risk probability associated with the situation based at least in part on the first probability distribution and the second probability distribution is in response to determining that the first object is physically closer to the first vehicle than the second object.

12. The method as recited in claim 5, further comprising:
determining a point associated with a first route at which the first vehicle is predicted to be nearest in physical proximity to the first object comprising determining a point of time, wherein determining the first probability distribution and the second probability distribution is at the point of time.

13. The method as recited in claim 5, further comprising:
determining a maneuver associated with the first vehicle based on the set of parameters; and transmitting the maneuver to the first vehicle.

14. One or more non-transitory computer-readable media storing instructions that, when executed by one or more processors, cause one or more computing devices to perform operations comprising:

identifying a first object and a second object represented by sensor data captured from a sensor associated with a vehicle in an environment;

determining, based at least in part on a first error model, a first probability distribution associated with an estimated location of the first object;

determining, based at least in part on a second error model, a second probability distribution associated with an estimated location of the second object;

determining, based at least in part on a third error model and at least one parameter associated with the vehicle, a third probability distribution associated with an estimated location of the vehicle in the environment;

determining a first probability based at least in part on the first probability distribution and the second probability distribution;

determining a second probability based at least in part on the second probability distribution and the third probability distribution;

placing a limitation on a variation of a subset of the at least one parameter associated with the vehicle, and updating the subset of the at least one parameter associated with the vehicle to reduce a risk probability that is generated based at least in part on a plurality of statistical based simulations and formed by the first probability and the second probability to less than or equal to a threshold; and transmitting a set of parameters including the at least one parameter to the vehicle.

15. The one or more non-transitory computer-readable media as recited in claim 14, further comprising:

determining, based at least in part on the sensor data, a point of time when the sensor is in closest physical proximity to the first object, wherein the first probability distribution and the second probability distribution are determined at the point of time.

16. The one or more non-transitory computer-readable media as recited in claim 14, wherein the vehicle is configured to alter a maneuver based at least in part on the set of parameters.

17. The one or more non-transitory computer-readable media as recited in claim 14, wherein the first probability is associated with a likelihood of a collision between the first object.

18. The one or more non-transitory computer-readable media as recited in claim 14, wherein updating the subset of the at least one parameter is based at least in part on applying a statistical sampling technique to the subset of the at least one parameter.

19. The one or more non-transitory computer-readable media as recited in claim 14, wherein determining the first probability further comprises determining a geometric overlap between the first probability distribution and the second probability distribution.

20. The one or more non-transitory computer-readable media as recited in claim 14, the operations further comprising:

determining, based at least in part on the first error model, a fourth probability distribution associated with a second estimated location of the second object;

determining, based at least in part on the second error model, a fifth probability distribution associated with a second estimated location of the vehicle; and determining a third probability based at least in part the fourth probability distribution and the fifth probability distribution, wherein updating the subset of the at least one parameter is based at least in part on a comparison of a sum of the first probability and the third probability to the threshold.

* * * * *